(12) United States Patent
Di Pietro et al.

(10) Patent No.: US 10,972,770 B2
(45) Date of Patent: Apr. 6, 2021

(54) METHOD FOR ENCRYPTING DATA STREAMS WITH NEGOTIABLE AND ADAPTABLE ENCRYPTION LEVELS

(71) Applicant: Citrix Systems, Inc., Fort Lauderdale, FL (US)

(72) Inventors: Marcos Alejandro Di Pietro, Hallandale Beach, FL (US); Thierry Duchastel, Cooper City, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 282 days.

(21) Appl. No.: 15/867,353

(22) Filed: Jan. 10, 2018

(65) Prior Publication Data

US 2019/0215541 A1    Jul. 11, 2019

(51) Int. Cl.
*H04L 29/06*    (2006.01)
*H04N 21/2347*    (2011.01)
*H04N 21/658*    (2011.01)
*H04N 21/258*    (2011.01)

(52) U.S. Cl.
CPC ..... *H04N 21/2347* (2013.01); *H04L 63/0428* (2013.01); *H04L 63/205* (2013.01); *H04N 21/23476* (2013.01); *H04N 21/25833* (2013.01); *H04N 21/6582* (2013.01)

(58) Field of Classification Search
CPC ......... H04N 21/2347; H04N 21/23476; H04N 21/25833; H04N 21/6582; H04L 63/205; H04L 63/0428
See application file for complete search history.

(56) References Cited

U.S. PATENT DOCUMENTS

| | | | |
|---|---|---|---|
| 7,151,832 B1* | 12/2006 | Fetkovich | G06F 21/606 380/210 |
| 2003/0225880 A1* | 12/2003 | Srivastava | G06F 11/326 709/224 |
| 2008/0025516 A1* | 1/2008 | Masuhiro | H04L 63/0428 380/279 |
| 2010/0005483 A1* | 1/2010 | Rao | H04L 63/0428 725/25 |

OTHER PUBLICATIONS

International Search Report and Written Opinion for International Appl. No. PCT/US2019/012061, dated Apr. 11, 2019.
International Preliminary Report on Patentability on International Appl. No. PCT/US2019/012061, dated Jul. 23, 2020.
Examination Report AU Appl. No. 2019206298 dated Nov. 30, 2020.

* cited by examiner

*Primary Examiner* — Chau Le
*Assistant Examiner* — Han Yang
(74) *Attorney, Agent, or Firm* — Foley & Lardner LLP

(57) ABSTRACT

Described embodiments provide systems and methods for data encryption. A server communicating data with a client can determine a level of data encryption on the data that the server is capable of handling according to resources available to the server. A level of data encryption can include a type of encryption and a strength of the type of data encryption. The server can receive a level of data encryption on the data that the client is capable of handling according to resources available to the client. The server can identify a level of data encryption with which the server and the client agree to proceed, according to the determined level of data encryption and the received level of data encryption. The server, following a predefined interval, can identify an updated level of data encryption with which the server and the client agree to proceed.

20 Claims, 7 Drawing Sheets

METHOD FOR ENCRYPTING DATA STREAMS WITH NEGOTIABLE AND ADAPTABLE ENCRYPTION LEVELS

FIELD OF THE DISCLOSURE

The present application generally relates to data encryption, including but not limited to systems and methods for adaptable encryption of a data stream.

BACKGROUND

A server streaming a video to a device can increase or degrade the quality of the video based on network bandwidth resources available between the server and the device. The resulting video as displayed or rendered at the device may reflect varying quality levels ranging from low to high definition, and may also be indicative of dropped or delayed packets or frames.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

The present disclosure is directed towards embodiments of systems and methods for encrypting a data stream. A data stream can include any number of packets or frames being communicated between two devices, such as audio, video and/or multimedia data, and can be part of a communication session between users, or an application delivery stream (e.g., remote application or desktop provisioning session). To secure such a data stream (e.g., via encoding or encryption), some embodiments of the present system and methods can adapt the level (e.g., strength and/or type) of encryption being applied on portions of the data stream.

Within a client-server relationship, devices can interoperate, communicate or negotiate with each other to dynamically modify or update the level of encryption to be applied on data to be transmitted between the devices, and/or the level of decryption to be performed on the data when received. The level of encryption can be adjusted at particular interval(s), according to available resources for instance, and can be selected independent of, or dependent on the quality of the data stream.

In one aspect, the present disclosure is directed to a method of encryption. The method can include determining, by a server communicating data with a client, a level of data encryption on the data that the server is capable of handling according to resources available to the server. A level of data encryption can include a type of encryption and a strength of the type of data encryption. The server can receive a level of data encryption on the data that the client is capable of handling according to resources available to the client. The server, in communication with the client, can identify a level of data encryption with which the server and the client agree to proceed, according to the determined level of data encryption and the received level of data encryption. The server, in communication with the client following a predefined interval, can identify an updated level of data encryption with which the server and the client agree to proceed.

In some embodiments, the server determines the resources available to the server. The resources available to the server can include at least one of: network bandwidth, processor or computational capacity, memory, or battery level or consumption rate. The predefined interval can include a predefined interval of time or a predefined amount of data communicated or encrypted. The server and/or the client can identify the level of data encryption with which the server and the client agree to proceed, as being above a predefined minimum level of encryption. The server and/or the client can identify the level of data encryption with which the server and the client agree to proceed, as being capable of supporting a predefined service level agreement for delivery of the data.

The server and/or the client can encrypt the data according to the level of data encryption with which the server and the client agree to proceed, by encrypting every full frame and update frame of video or audio data. The server and/or the client can encrypt the data according to the level of data encryption with which the server and the client agree to proceed, by encrypting every full frame of video or audio data. The server and/or the client can encrypt the data according to the level of data encryption with which the server and the client agree to proceed, by encrypting every N-th full frame of video or audio data. N can be a predefined integer value. The level of data encryption with which the server and the client agree to proceed, can correspond to one of a plurality of levels of data encryption.

In one aspect, the present disclosure is directed to a system of encryption. The system can include a benchmarking engine executable on a server communicating data with a client. The benchmarking engine can determine a level of data encryption on the data that the server is capable of handling according to resources available to the server. A level of data encryption can include a type of encryption and a strength of the type of data encryption. A negotiation engine is executable on the server and can be in communication with the client. The negotiation engine can receive a level of data encryption on the data that the client is capable of handling according to resources available to the client. The negotiation engine can identify a level of data encryption with which the server and the client agree to proceed, according to the determined level of data encryption and the received level of data encryption. The negotiation engine can identify, following a predefined interval, an updated level of data encryption with which the server and the client agree to proceed.

In certain embodiments, the benchmarking engine can determine the resources available to the server. The resources available to the server can include at least one of: network bandwidth, processor or computational capacity, memory, or battery level or consumption rate. The predefined interval can include a predefined interval of time or a predefined amount of data communicated or encrypted. The negotiation engine can identify the level of data encryption on the data that the server is capable of handling, as being above a predefined minimum level of encryption. The negotiation engine can identify the level of data encryption that the server is capable of handling, as being capable of supporting a predefined service level agreement for delivery of the data.

In some embodiments, at least one processor of the server can encrypt the data according to the level of data encryption with which the server and the client agree to proceed, by encrypting every full frame and update frame of video or audio data. At least one processor of the server can encrypt the data according to the level of data encryption with which the server and the client agree to proceed, by encrypting every full frame of video or audio data. At least one processor of the server can encrypt the data according to the level of data encryption with which the server and the client agree to proceed, by encrypting every N-th full frame of video or audio data, where N is a predefined integer value. The level of data encryption with which the server and the client agree to proceed, can correspond to one of a plurality of levels of data encryption.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
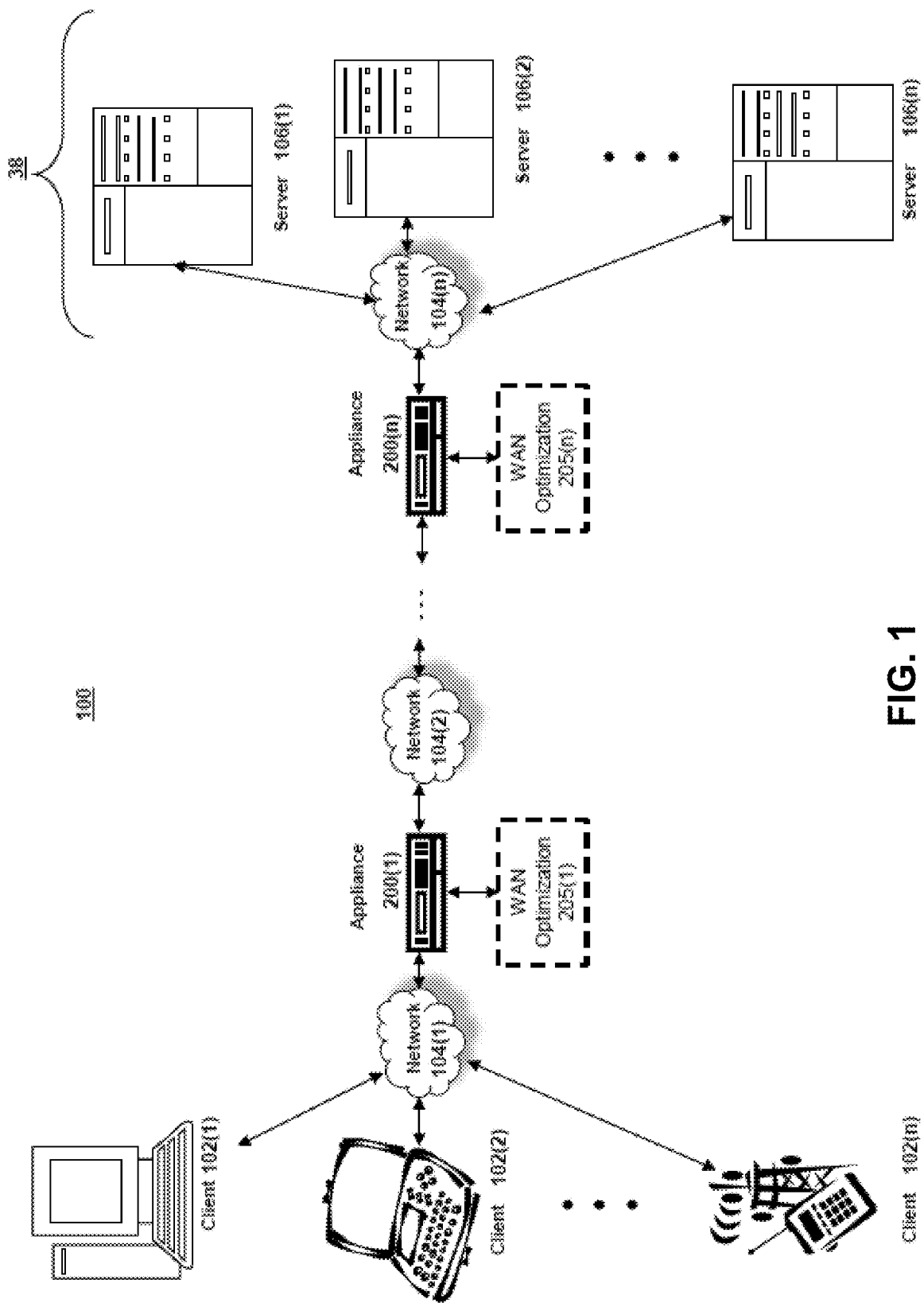
FIG. 1 is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein;

Section B describes systems and methods for encrypting a data stream.

A. Computing Environment

Prior to discussing specifics of the present systems and methods for encrypting a data stream, it may be helpful to discuss the computing environments in which such embodiments may be deployed.

Referring to FIG. 1, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1 shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Cloud-Bridge® products sold by Citrix Systems, Inc. of Fort Lauderdale, Fla.

Figure 2:
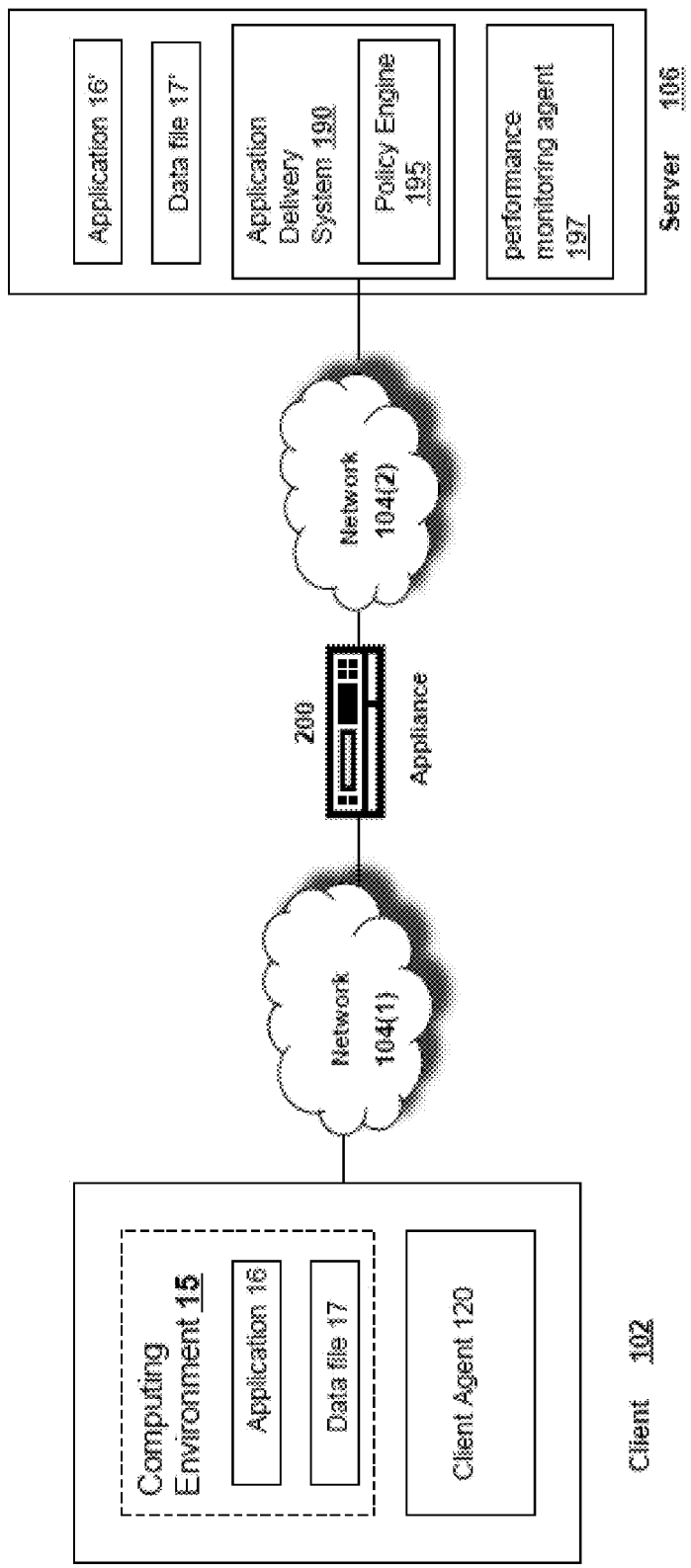
FIG. 2 is a block diagram of a network computing system for delivering a computing environment from a server to a client via an appliance, in accordance with an illustrative embodiment.

Referring to FIG. 2, an example network environment, 100', for delivering and/or operating a computing network environment on a client 102 is shown. As shown in FIG. 2, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 3.

Figure 3:
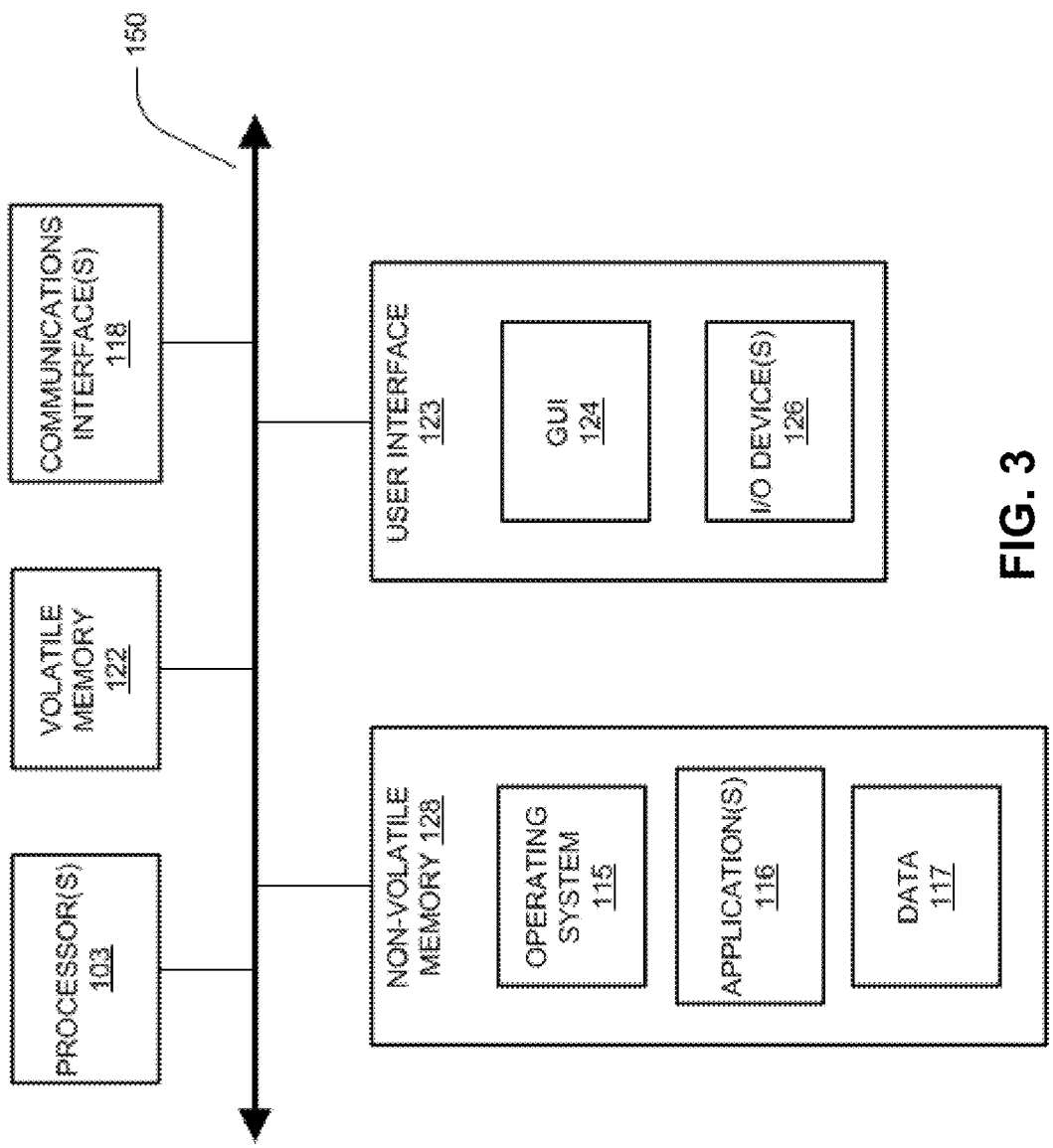
FIG. 3 is a block diagram of a computing device, in accordance with an illustrative embodiment.

As shown in FIG. 3, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 3 is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), and programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Encrypting a Data Stream

The present disclosure is directed towards embodiments of systems and methods for encrypting a data stream. A data stream can include any number of packets or frames being communicated between two devices, such as audio, video and/or multimedia data, and can be part of a communications session or an application delivery stream (e.g., remote application or desktop provisioning session). A data stream can include a web or cloud-based session, such as a software as a service (SaaS) session, or a data or content (e.g., software or publisher content) download session. To secure such a data stream cryptographically via encoding or encryption, some embodiments of the present system and methods can adapt or adjust the level (e.g., strength and/or type) of encryption being applied on portions of the data stream.

The computational cost of cryptographic processing or encryption operations on data between devices can be significant. As such, certain types of data (e.g., video data) are commonly not encrypted for example, while types of data streams that contain sensitive or confidential information may be identified for encryption which consumes substantial resources of a server for instance. However, by allowing one or more devices to determine or track resources available (e.g., for cryptographic operations), these devices can be configured and/or coordinated to perform various levels of encryption processing depending on available resources for example.

Within a client-server relationship for instance, devices can interoperate, communicate or negotiate with each other to dynamically modify or update the level of encryption to be applied on data to be conveyed between the devices, and/or the level of decryption to be performed on the data when received. The level of encryption can be adjusted at particular interval(s), according to resources available to one or more of these devices for instance, and can be selected independent of, or dependent on the quality of the data stream. The level of encryption can be adjusted according to or dependent on the amount of other types of processing being performed on the data stream, and the corresponding resources being expended and/or that are available. For example, in accordance with certain embodiments of the present solution, parts of a data stream may be allowed to be unencrypted, or encrypted at reduced level(s), to ensure that the stream of data is uninterrupted or falls within a certain service level, while providing a sufficient or acceptable level of protection to the transmitted data.

Figure 4:
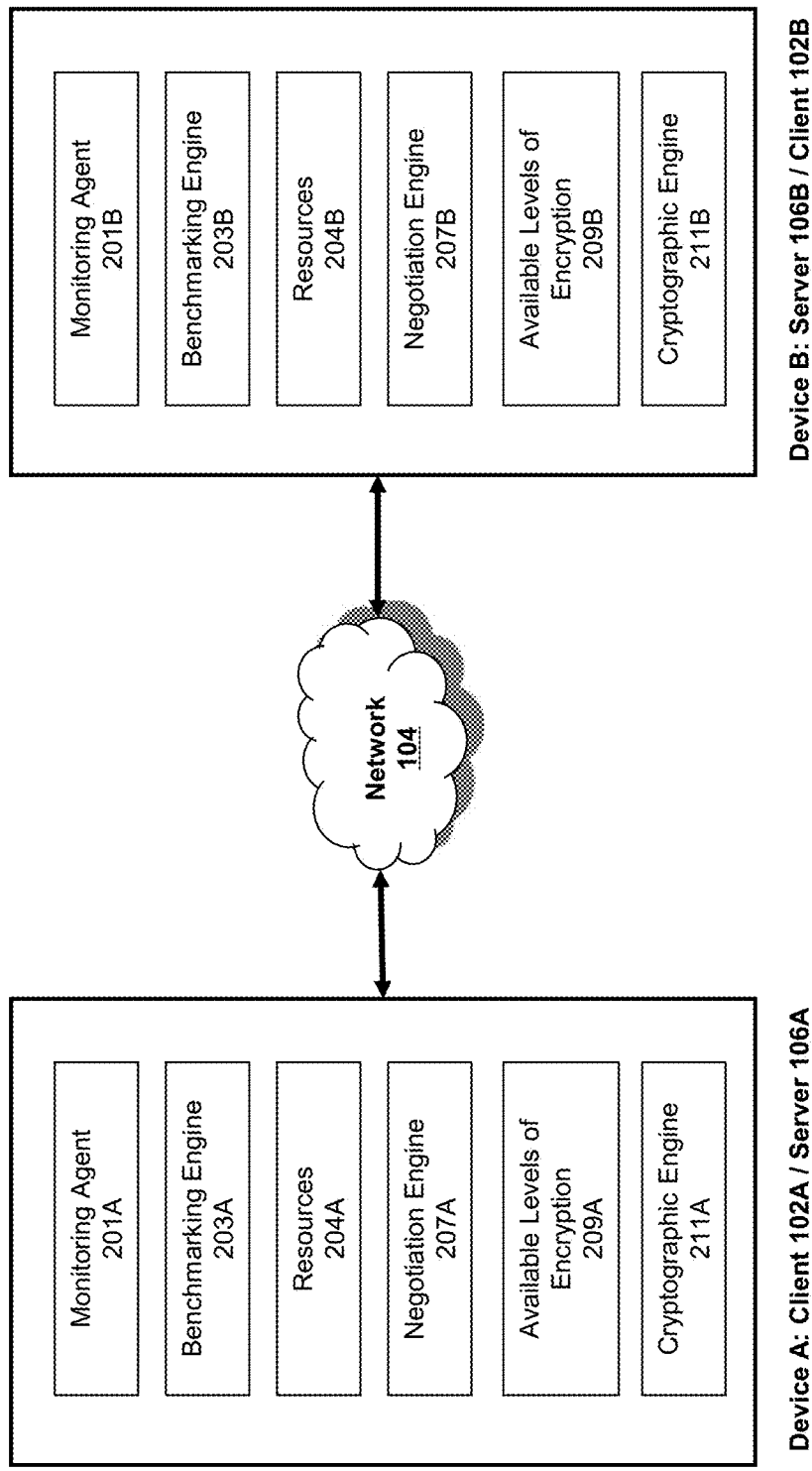
FIG. 4 is a block diagram of an embodiment of a system of data encryption.

Referring now to FIG. 4, an embodiment of a system 500 for encrypting a data stream is depicted. In brief overview, the system 500 may include a device in communication with at least another device (e.g., device A, and device B). Device A and device B may communicate data uni-directionally or bi-directionally between themselves, for example during at least a certain period of time. Each of devices A and B can comprise a client, a server, or an intermediary device (or appliance). Each of devices A and B can for example incorporate elements of embodiments of the computing device 101, client 102, server 106 and/or appliance 200 as discussed above in connection with FIGS. 1-3.

In some embodiments, device A and device B may each be a part of a network module/component, or can be distributed across more than one network module/component. For instance, in some embodiments, device A can include one or more servers 106 (e.g., of a server farm), and can stream or transmit data to device B (which can include one or more clients 102), as illustrated in FIG. 1 for example. Device A and device B may be communicatively connected via network 104, and the network 104 can include one or more network nodes such as appliance(s) 200, as illustrated in FIG. 1 for example.

Device A and/or device B can each include at least one of: a monitoring agent 201, a benchmarking engine 203, a negotiation engine 207, or a cryptographic engine 211. Device A and/or device B can have access to resources 204 and/or a plurality of levels of encryption 209, for use in handling or processing data being conveyed between themselves and/or with other device(s). Each of the above-mentioned elements or entities is implemented in hardware, or a combination of hardware and software, in one or more embodiments. For instance, each of these elements or entities can include any application, program, library, script, task, service, process or any type and form of executable instructions executing on hardware of the device. The hardware includes circuitry such as one or more processors, for example, as described above in connection with at least FIG. 3, in one or more embodiments.

The systems and methods of the present solution may be implemented in any type and form of device, including clients, servers and/or appliances. As referenced herein, a "server" may sometimes refer to any device in a client-server relationship, e.g., an appliance in communication with a client device. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments for instance.

Referring again to FIG. 4, device A and/or B can have access to a plurality of available levels of encryption 209. Each level of encryption can include or specify one or more cryptographic operations that can include decryption, encryption and/or related operations, which is not limited to encryption per se. A particular level of encryption can specify or include a strength of encryption and/or a type of encryption. Examples of types of encryption can include data encryption standard (DES), Triple DES, Rivest-Shamir-Adleman (RSA), Blowfish, Twofish, advanced encryption standard (AES). Examples of types of encryption can include secret key (or symmetric), public key, and hash function cryptography. Examples of types of encryption can include use of cryptographic algorithms such as Federal Information Processing Standards (FIPS), IP Security Protocol (IPsec), Secure Hypertext Transfer Protocol (S-HTTP), Secure Sockets Layer (SSL), Transport Layer Security (TLS), Pretty Good Privacy (PGP), and TrueCrypt. Examples of strength of (a type of) encryption can include or correspond to various key lengths such as 56-bit keys, 256-bit keys, 512-bit keys, and keys of various other lengths. Examples of strength of (a type of) encryption can include or correspond to various ciphers being used, such as RSA cipher and symmetric-key encryption cipher. Examples of strength of (a type of) encryption can include or correspond to various combinations of key lengths and/or ciphers being used.

In some embodiments, the device A and/or B can include a monitoring agent 201. The monitoring agent 201 can include certain features of embodiments of the monitoring agent 197 and/or client agent 120, as discussed above in connection with at least FIG. 2. The monitoring agent 201 can be implemented and/or designed to determine, identify, monitor and/or track resource(s) 204 available to device A and/or device B, or available for performing data encryption and/or decryption. The resources 204 can include resources inherent or included in device A and/or device B, such as computational or processing resources, memory, storage space, bus or connection bandwidth or data transfer capacity, power source or battery level, and/or availability of I/O(s) and communications interface(s). The resources 204 can include resources accessible by device A and/or device B, such as network bandwidth, resources in peripheral/supporting devices, cloud resources (e.g., cloud computing and/or storage), external power, and/or other network resources. In some embodiments, the resources 204 can include software and/or hardware capable of performing one or more levels of encryption or cryptographic operations.

In some embodiments, the device A and/or B can include or host a benchmarking engine 203. The benchmarking engine can be implemented and/or designed to determine, calculate or identify one or more levels of data encryption on the data stream that the corresponding device is capable of handling according to available resources. Even though, the sender device (e.g., device A) and the receiver device (e.g., device B) might not have sufficient resources to encrypt the full stream of data, these devices can have enough computational resources to partially and/or smartly encrypt the stream of data. Accordingly, the benchmarking engine can determine or select one or more suitable levels of data encryption that can be supported on the corresponding device. In certain embodiments, the benchmarking engine incorporates the monitoring agent 201, and is configured to determine the resources available to the corresponding device.

The benchmarking engine 203 can run benchmarks, tests, projections and/or simulations on a corresponding device to determine available resources or capacity. For instance, the benchmarking engine 203 can perform one or more levels of encryption on test data, or a portion of the data stream, and may determine if there are sufficient resources to support the one or more levels of encryption. The benchmarking engine 203 can benchmark, discover and/or measure a particular resource or a number of resources. A server and a client can thus run benchmarks against the available resources to determine what level of encryption they are capable of performing with the current available computational resources.

In some embodiments, the device A and/or B can include or host a negotiation engine 207. A negotiation engine 207 can determine, identify and/or manage the use of one or more levels of data encryption at a corresponding device. A negotiation engine 207A of one device (e.g., device A) can communicate with a negotiation engine 207B of another device (e.g., device B). For example, negotiation engine 207A can receive, from negotiation engine 207B, an identification of one or more levels of data encryption on the data stream that device B is capable of handling according to resources available to device B.

In some embodiments, the negotiation engine(s) can select one level of encryption that can be found in the determined level(s) of data encryption and the received level(s) of data encryption. The selected level of encryption can be one that uses the least, most, or balanced level of available resources, and/or one that provides a highest, strongest or most sustainable level/extent of encryption on the data stream, by one or both of the devices. The negotiation engine(s) can select or identify a level of data encryption that the device(s) are capable of handling, that is above a predefined or agreed-upon minimum level of encryption. The negotiation engine(s) can select or identify a level of data encryption that the device(s) are capable of handling, the level of data encryption being capable of supporting a predefined service level agreement for delivery of the data stream. The predefined service level agreement may have been negotiated between the devices A and B, and/or for the network 104.

The negotiation engine(s) can negotiate, identify, select, propose, request and/or determine a level of data encryption with which device A and device B can support or can agree to proceed with, according to the level(s) of data encryption determined by the benchmarking engine(s), and the received level(s) of data encryption. A negotiation engine can actively negotiate with another negotiation engine to arrive at an agreed upon level of encryption, or can passively receive instructions from another negotiation engine to use a specified level of encryption. In certain embodiments, a negotiation engine can unilaterally or bilaterally decide on a level of encryption to use on its corresponding device and/or other device(s), e.g., that can be supported on the corresponding device and/or the other device(s). For example, based on a server and a client's benchmarks, the server and the client can negotiate a most suitable encryption mechanism/type and strength level that they are capable of supporting.

In some embodiments, the device A and/or B can include or host a cryptographic engine 211. The cryptographic engine 211 is implemented and/or designed to perform data encryption and/or decryption on the data stream. Data encryption and/or decryption can include any cryptographic related operation for securing or protecting data being transmitted, and can include operations such as encoding/decoding, data scrambling/unscrambling, hashing, cipher functions, crypto-keys operations/management, compression, and/or message verification. The cryptographic engine 211 can incorporate or include any portion of the resources 204 (e.g., software algorithms, hardware, and/or hash tables) that can be utilized to perform the selected or identified levels of encryption or cryptographic operations. The cryptographic engine 211 can encrypt/process the data according to the level of data encryption with which the devices can support or agree to proceed. The data stream can be encrypted using the encryption mechanism and strength level negotiated by the devices, and the encrypted data stream transmitted. For example, the cryptographic engine 211 can encrypt every full frame and update frame of video or audio data, or encrypt every full frame of video or audio data, or encrypt every N-th full frame of video or audio data. N can be a predefined integer value (e.g., 2, 5, 10, or other number).

Following a predefined interval, the negotiation engine(s) can identify and/or select an updated level of data encryption with which the device(s) can support, or maintain a current level of data encryption, or determine to halt encryption (e.g., temporarily, for at least the length of the predetermined interval). The predefined interval can correspond to, or comprise a predefined interval of time (e.g., 5 seconds, 20 seconds, 1 minute, or other duration), or a predefined amount of data communicated or encrypted (e.g., 1 Kbyte, 500 Kbytes, 10 Mbytes, or other amount of data).

For instance, after an X amount of data or after a Y amount of time, a server and a client can perform benchmarks again and renegotiate the encryption mechanism/type and level to adapt to the current level of available resources on both ends. The benchmarking engine(s) can set or define (resource level) thresholds or rules for each benchmarked resource. A benchmarked resource can include, but is not limited to network bandwidth, central processing unit (CPU) usage, random access memory (RAM) usage, battery consumption, etc. The benchmarking engine(s) can for example set or define a rule stating that "if CPU usage is above a threshold of 80%, then reduce the encryption level". If the benchmark results indicate that the encryption level should be lowered (or increased), then the benchmarking engine can for instance identify a level of encryption that can ensure reliable communication.

Thus, following a predefined interval or responsive to the predefined interval, the monitoring agent(s) can determine available resources at that point, the benchmarking engine(s) can determine candidate levels of encryption responsive to the available resources (at that point), the negotiation eng-ine(s) can identify or select an updated level of data encryption with which the device(s) can support, responsive to the candidate levels of encryption. By way of illustration, from amongst the candidate levels of encryption, a negotiated (or renegotiated) level of encryption can include, but not are limited to: (i) very strong encryption (e.g., encrypt every frame of a video stream); (ii) medium strong encryption (e.g., encrypt only every full video frame of a video stream); (iii) weak encryption (e.g., encrypt every N-th full video frame of a video stream); (iv) no encryption (e.g., it is determined that encryption is not possible with the current resources).

Figure 5A:
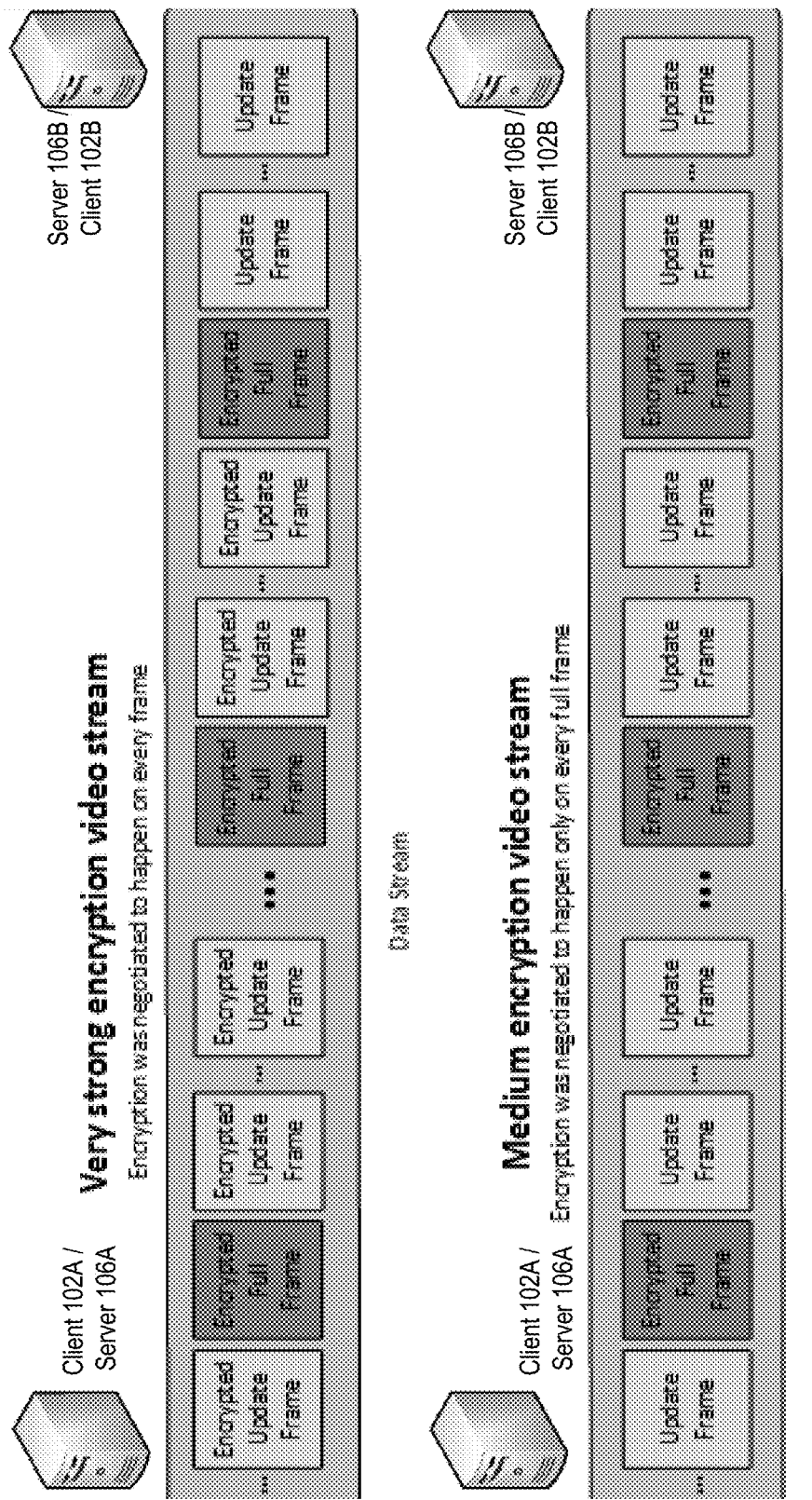
FIGS. 5A and 5B are example representations of possible levels of encryption that can be applied on a data stream.
Figure 5B:
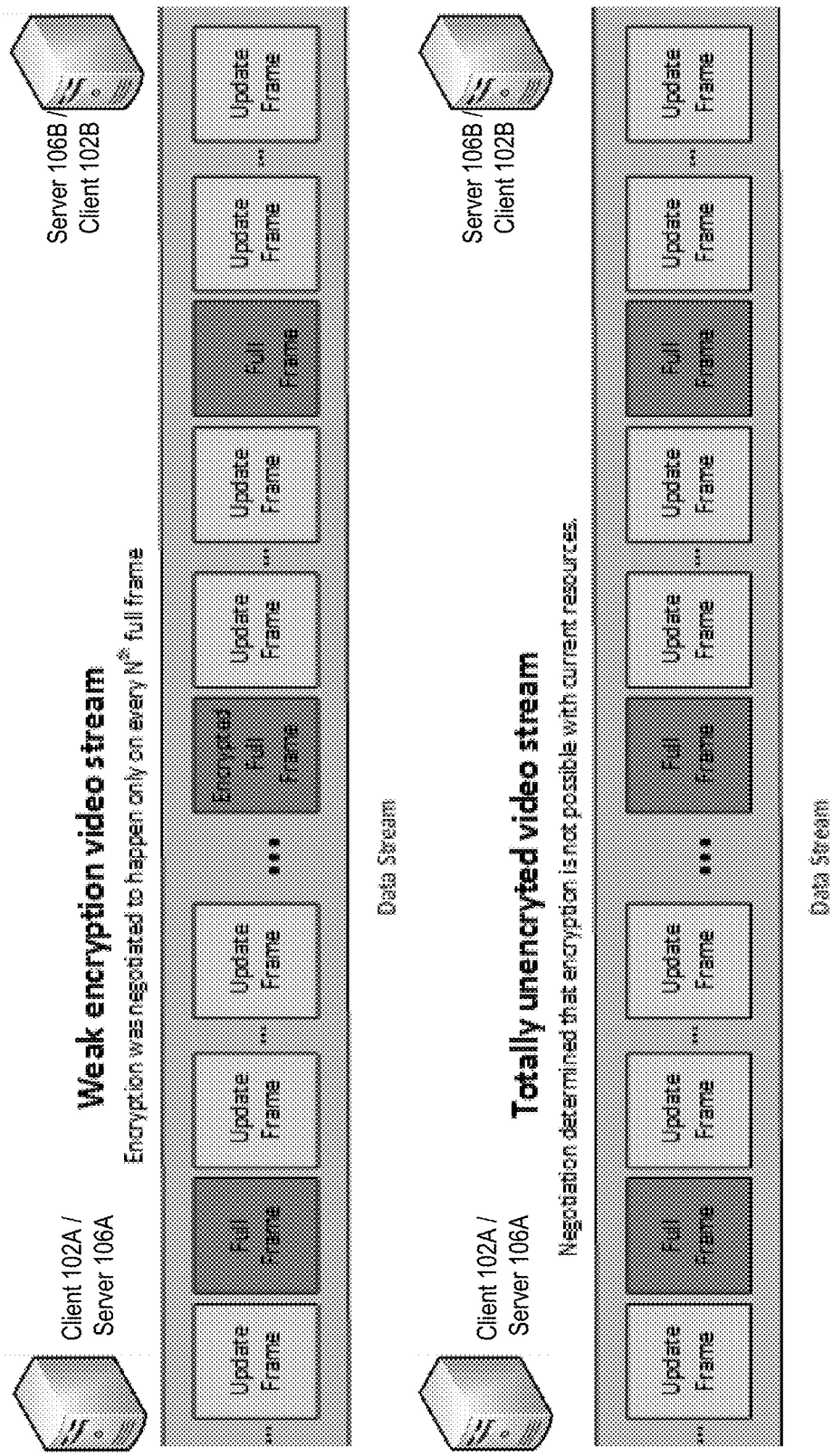

FIGS. 5A and 5B depict examples of negotiated (or renegotiated) levels of encryption on a video stream. A video stream may be encoded in a sequence of full frames and update frames. At a high-level, a video compression/encoding scheme can have a full frame at every N frames, where the data to display an entire image of the video is included, while the other update frames are just the deltas (the differences) from the previous (full or update) frame. Hence, by encrypting and securing the key frames (e.g., full frames), then the unencrypted deltas or update frames can only provide an incomplete picture to an unauthorized user. Without the full frames, there is no "base" or reference on which to make sense of the delta frames. It should be noted that although video frames and streams are discussed herein, these are merely by way of illustration and not intended to be limiting in any way. Other types of data streams and transmissions (e.g., contents of an audio communication, or a screen sharing session) can be adaptively encrypted to offer suitable levels of protection.

In some embodiments, the devices or negotiation engines can agree on a minimum level of encryption. For instance, both a client and a server can have their own setting (or policy) that dictates what the minimum level of encryption should be. When the server and the client perform an initial handshake or communications exchange, the devices can compare their minimum encryption levels, and the highest of the two can be selected as the lowest encryption level that the video stream can be sent as. If later or further negotiations indicate that both devices can proceed to a higher encryption level, then both devices can synchronize or agree to proceed to use that higher encryption level. If for instance that the resource level thresholds indicate that even the agreed-upon minimum level of encryption cannot be honored or met, then the data stream may be stopped and not delivered.

As such, embodiments of the present system can selectively and adaptively apply encryption on data streams, according to the costs of performing such operations for instance. Depending on available resources, the sender and receiver devices of a stream of data can negotiate an adaptable level of encryption that is suitable for the resources available on both ends, thus, resulting in a more secure transmission of data without compromising (or significantly compromising) the reliability of the communication. Devices, such as a server and a client, can negotiate on a method or level of encryption on one or more streams of data, which can be adapted based on the available resources. The system can adapt the strength/level of encryption performed on the stream of data based on a negotiation between the server and the client, which accounts for the available resources on both ends. Embodiments of the present solution can provide a way of lowering transmission reliability (e.g., adaptively or dynamically) in favor of increased encryption levels, and conversely provide a way of lowering encryption levels to allow for more reliable transmission. In some embodiments, a policy can be set by the system or each device to ensure that a desired minimum encryption level is met.

Figure 6:
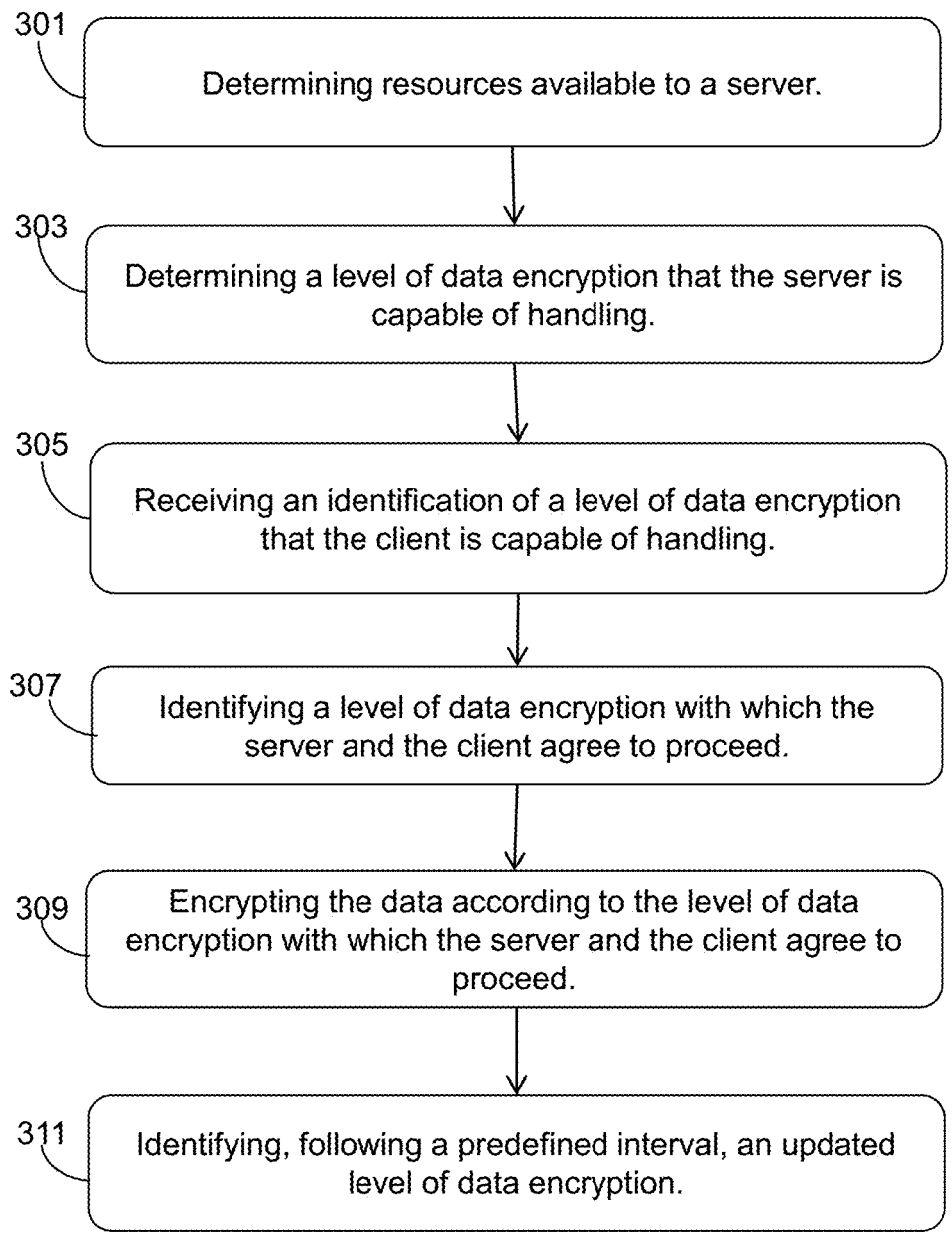
FIG. 6 is a flow diagram of an embodiment of a method of data encryption.

Referring now to FIG. 6, a flow diagram depicting steps or operations in one embodiment of a method for data encryption is shown. In brief summary, the method can include determining, by a server, resources available to the server (301). The server can determine a level of data encryption that the server is capable of handling (303). The server can receive a level of data encryption that a client is capable of handling (305). The server and/or client can identify a level of data encryption with which the server and the client agree to proceed (307). The server and/or client can encrypt the data according to the level of data encryption with which the server and the client agree to proceed (309). The server can, following a predefined interval, identify an updated level of data encryption (311).

Referring now to (301), and in some embodiments, a server can determine one or more resources available to the server. A monitoring agent executing on the server can determine one or more resources available to the server and/or to a client. The available resources can include at least one of: network bandwidth, I/O or interface bandwidth, processor or computational capacity, bus/connection bandwidth within the device, memory, storage capacity, network/cloud resources, or battery/power-source level (e.g., according to energy consumption rate). The available resources can include resources for performing data encryption and/or decryption, such as software and/or hardware capable of performing one or more levels of data encryption.

Referring now to (303), and in some embodiments, the server can determine a level of data encryption that the server is capable of handling. A benchmarking engine of the server can determine a level of data encryption that the server is capable of handling. The benchmarking engine can determine the level of data encryption according to resources available to or accessible by the server. A level of data encryption can include a type of encryption and/or a strength of the type of data encryption. The benchmarking engine can determine or select one or more suitable levels of data encryption that can be supported on the server. In certain embodiments, the benchmarking engine incorporates the monitoring agent, and is configured to determine the resources available to the server. The benchmarking engine can run benchmarks, tests, projections and/or simulations on the server to determine available resources or capacity. For instance, the benchmarking engine can perform one or more levels of encryption on test data, or a portion of the data stream, and may determine if there are sufficient resources to support the one or more levels of encryption.

Referring now to (305), and in some embodiments, the server can receive a level of data encryption that a client is capable of handling. A negotiation engine of the server can receive an indication of one or more levels of encryption that the client is capable of handling, according to resources available to the client. The negotiation engine of the server can communicate with a negotiation engine and/or benchmarking engine of the client. The negotiation engine of the server may request information about supported encryption levels from the negotiation engine and/or benchmarking engine of the client for example. In some embodiments, the negotiation engine may share with or send to the client information about one or more levels of data encryption that can be supported on the server.

Referring now to (307), and in some embodiments, the server and/or client can identify a level of data encryption with which the server and the client agree to proceed. For instance, the server in communication with the client, can identify a level of data encryption with which the server and the client can agree to proceed or can support, according to the level(s) of data encryption determined for the server and the level(s) of data encryption received from the client. The negotiation engine of the server can determine, identify and/or manage the use of one or more levels of data encryption at the server.

In some embodiments, the negotiation engine(s) can select a level of encryption that can be found in both the determined level(s) of data encryption and the received level(s) of data encryption. The selected level of encryption can be one that uses the least, most, or balanced level of available resources, and/or one that provides a highest, strongest or most sustainable level of encryption on the data stream, by one or both of the server and the client. The negotiation engine(s) can select or identify a level of data encryption that the server and/or the client are capable of handling, and with which the server and the client agree to proceed, that is above a predefined minimum level of encryption. The negotiation engine(s) can select or identify a level of data encryption that the device(s) are capable of handling, and with which the server and the client agree to proceed, such that the level of data encryption is capable of supporting a predefined service level agreement for delivery of the data stream.

The negotiation engine(s) can negotiate, identify, select, propose, request and/or determine a level of data encryption with which the server and the client can support or can agree to proceed with, according to the level(s) of data encryption determined by the benchmarking engine(s), and the received level(s) of data encryption. The negotiation engine of the server can actively negotiate with the negotiation engine of the client to arrive at an agreed upon level of encryption, or can passively receive instructions from the negotiation engine of the client to use a specified level of encryption.

Referring now to (309), and in some embodiments, the server and/or client can encrypt the data according to the level of data encryption with which the server and the client agree to proceed. A cryptographic engine of the server and/or a cryptographic engine of the client can perform data encryption and/or decryption according to the level of data encryption. Data encryption and/or decryption can include any cryptographic related operation for securing or protecting data being transmitted, and can include operations such as encoding/decoding, data scrambling/unscrambling, hashing, cipher functions, crypto-keys operations/management, compression, and/or message verification. The server can encrypt the data stream using the encryption mechanism and strength level negotiated by the server and the client. For example, the cryptographic engine of the server can encrypt every full frame and update frame of video or audio data, or encrypt every full frame of video or audio data, or encrypt every N-th full frame of video or audio data. N can be a predefined integer value (e.g., 2, 5, 10, or other number).

Referring now to (311), and in some embodiments, the server can, following a predefined interval, identify an updated level of data encryption. The server, in communication with the client following a predefined interval, can identify an updated level of data encryption with which the server and the client shall proceed. The predefined interval can correspond to or include a predefined interval of time (e.g., 5 seconds, 20 seconds, 1 minute, or other duration), or a predefined amount of data communicated or encrypted (e.g., 1 Kbyte, 500 Kbytes, 10 Mbytes, or other amount of data). Following the predefined interval, one or both of the negotiation engines can identify and/or select an updated level of data encryption with which the server and the client can support, or maintain a current level of data encryption, or determine to halt encryption (e.g., temporarily, for at least the length of the predefined interval).

Following the predefined interval or responsive to the predefined interval, the monitoring agent(s) can determine available resources at that point, the benchmarking engine(s) can determine candidate levels of encryption responsive to the available resources (at that point), the negotiation engine(s) can identify or select an updated level of data encryption with which the device(s) can support, responsive to the candidate levels of encryption. By way of illustration, and from amongst the candidate levels of encryption, a negotiated (or renegotiated) level of encryption can include, but is not limited to: (i) very strong encryption (e.g., encrypt every frame of a video stream); (ii) medium strong encryption (e.g., encrypt only every full video frame of a video stream); (iii) weak encryption (e.g., encrypt every N-th full video frame of a video stream); (iv) no encryption (e.g., it is determined that encryption is not possible with the current resources).

In some embodiments, the server and the client can agree on a minimum level of encryption. For instance, both the client and the server can have their own setting (or policy) that dictates what the minimum level of encryption should be. When the server and the client perform an initial handshake or communications exchange, the devices can compare their minimum encryption levels, and the highest of the two can be selected as the lowest encryption level that the data stream can be sent with. If later or further negotiations indicate that both devices can proceed to a higher encryption level, then both devices can synchronize to proceed to use that higher encryption level. If for instance that the resource level thresholds indicate that even the agreed-upon minimum level of encryption cannot be honored or met, then the data stream may be stopped and not be delivered. Accordingly, embodiments of the present system can selectively and adaptively apply encryption on data streams, according to the available resources for performing such operations.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method of encryption, the method comprising:
   determining, by a server according to resources available to the server, a first set of one or more levels of data encryption that the server is capable of handling on data to be communicated with a client for a first time instance, wherein a level of data encryption comprises a type of encryption and a strength of the type of data encryption;
   receiving, by the server from the client, a second set of one or more levels of data encryption that the client is capable of handling on the data according to resources available to the client for the first time instance;
   selecting, by the server, a first level of data encryption for the first time instance that is in both the determined first set of one or more levels of data encryption and the received second set of one or more levels of data encryption, with which the server and the client agree to proceed; and
   identifying, by the server in communication with the client following an interval, an updated level of data encryption for a second time instance, that is in both another first set of one or more levels of data encryption for the second time instance and another second set of one or more levels of data encryption for the second time instance, with which the server and the client agree to proceed.

2. The method of claim 1, further comprising determining, by the server, the resources available to the server.

3. The method of claim 1, wherein the resources available to the server comprises at least one of: network bandwidth, processor or computational capacity, memory, or battery level or consumption rate.

4. The method of claim 1, wherein the interval comprises an interval of time or an amount of data communicated or encrypted.

5. The method of claim 1, further comprising identifying the level of data encryption with which the server and the client agree to proceed, as being above a predefined minimum level of encryption.

6. The method of claim 1, further comprising identifying the level of data encryption with which the server and the client agree to proceed, as being capable of supporting a predefined service level agreement for delivery of the data.

7. The method of claim 1, further comprising encrypting the data according to the level of data encryption with which the server and the client agree to proceed, by encrypting every full frame and update frame of video or audio data.

8. The method of claim 1, further comprising encrypting the data according to the level of data encryption with which the server and the client agree to proceed, by encrypting every full frame of video or audio data.

9. The method of claim 1, further comprising encrypting the data according to the level of data encryption with which the server and the client agree to proceed, by encrypting every N-th full frame of video or audio data, where N is a predefined integer value.

10. The method of claim 1, wherein the level of data encryption with which the server and the client agree to proceed, corresponds to one of a plurality of levels of data encryption.

11. A system of encryption, the system comprising:
a benchmarking engine executable on a server, the benchmarking engine configured to determine, according to resources available to the server, a first set of one or more levels of data encryption that the server is capable of handling on data to be communicated with a client for a first time instance, wherein a level of data encryption comprises a type of encryption and a strength of the type of data encryption;
a negotiation engine executable on the server and in communication with the client, the negotiation engine configured to:
receive from the client a second set of one or more levels of data encryption that the client is capable of handling on the data according to resources available to the client for the first time instance;
select, a first level of data encryption for the first time instance that is in both the determined first set of one or more levels of data encryption and the received second set of one or more levels of data encryption, with which the server and the client agree to proceed; and
identify, following an interval, an updated level of data encryption for a second time instance, that is in both another first set of one or more levels of data encryption for the second time instance and another second set of one or more levels of data encryption for the second time instance, with which the server and the client agree to proceed.

12. The system of claim 11, wherein the benchmarking engine is further configured to determine the resources available to the server.

13. The system of claim 11, wherein the resources available to the server comprises at least one of: network bandwidth, processor or computational capacity, memory, or battery level or consumption rate.

14. The system of claim 11, wherein the interval comprises an interval of time or an amount of data communicated or encrypted.

15. The system of claim 11, wherein the negotiation engine is configured to identify the level of data encryption on the data that the server is capable of handling, as being above a predefined minimum level of encryption.

16. The system of claim 11, wherein the negotiation engine is configured to identify the level of data encryption that the server is capable of handling, as being capable of supporting a predefined service level agreement for delivery of the data.

17. The system of claim 11, further comprising at least one processor of the server configured to encrypt the data according to the level of data encryption with which the server and the client agree to proceed, by encrypting every full frame and update frame of video or audio data.

18. The system of claim 11, further comprising at least one processor of the server configured to encrypt the data according to the level of data encryption with which the server and the client agree to proceed, by encrypting every full frame of video or audio data.

19. The system of claim 11, further comprising at least one processor of the server configured to encrypt the data according to the level of data encryption with which the server and the client agree to proceed, by encrypting every N-th full frame of video or audio data, where N is a predefined integer value.

20. The system of claim 11, wherein the level of data encryption with which the server and the client agree to proceed, corresponds to one of a plurality of levels of data encryption.

* * * * *